United States Patent Office 3,223,664
Patented Dec. 14, 1965

3,223,664
THERMOPLASTIC MOLDING COMPOSITIONS
Ralph David Conlon, Deer Park, Ohio, assignor to The Procter & Gamble Company, Cincinnati, Ohio, a corporation of Ohio
No Drawing. Filed Feb. 4, 1963, Ser. No. 256,094
9 Claims. (Cl. 260—29.1)

This invention relates to molding and molded thermoplastic resin compositions containing additives which impart greatly enhanced processing and molding characteristics. Further, this invention relates to the reduction of electrostatic charges on these resins in their final molded form.

The term "thermoplastic resin" as used herein includes the widely used plastic molding materials, polyethylene, polypropylene, polyvinyl chloride, polystyrene, polymethylmethacrylate, combinations and copolymers of these substances, and especially, those thermoplastic molding materials which tend to build up electrostatic charges during molding.

The conventional method by which thermoplastic resins are prepared for molding is by extrusion. The resin in particulate (powder, pellet or granular) form is fed through a hopper into a heated extruding barrel where the resin is made plastic by heat and worked by a continuously revolving screw. The hot plastic mass is carried along by the screw and out through a screen and a shaping orifice or nozzle for final molding into desired shapes.

It is well known in the plastics molding field that the speed and ease with which various thermoplastic resins can be processed and extruded is generally limited by the individual physical characteristics of the resins themselves. Attempts to incorporate various "molding aids," "mold release agents," and molding "lubricants" in these resins have often proved to be futile in that they so deleteriously affect the physical properties of the final molded product (strength, color, ductility) that their incorporation is undesirable.

Similar results have frequently been noted when attempts were made to incorporate so-called "antistatic" agents, more fully hereinafter defined, directly in molding compositions. Thermoplastic resins tend to build up electrostatic charges during molding. These charges attract dust particles to the molded article, creating an unsightly soiled appearance. Antistatic agents are frequently applied externally to these molded articles to prevent attraction of dust. However, such an application requires complex and expensive equipment; furthermore, the coating is often only temporary in nature, being prone to removal in normal household handling and usage. Inclusion of adequate amounts of antistatic agent directly in the resin composition during the molding process has often resulted in a brittle, unsatisfactory product which was seriously discolored.

Thus, it is an object of this invention to provide a thermoplastic resin molding composition having improved processing and molding characteristics and to provide a process for preparing such a composition.

Another object of this invention is to provide compositions consisting essentially of a thermoplastic resin composition and an antistatic agent which have improved processing and molding characteristics.

An additional object of this invention is to provide a thermoplastic resin molding composition in which useful amounts of commercially available antistatic agents can be incorporated without coincident undesirable effects on the physical properties of the finished molded article.

A further object of this invention is to provide a molded composition which consists essentially of a thermoplastic resin and additives, which has improved physical characteristics.

This invention is concerned with the discovery that the addition of relatively small amounts of sodium chloride (0.1 to 10% by weight) will markedly improve the processing and molding characteristics of particulate thermoplastic resin molding compositions and the physical characteristics of the molded compositions.

The thermoplastic resin used in the molding composition of this invention can consist solely of a thermoplastic resin, or it can be composed of a mixture of a thermoplastic resin, or resins, and a sufficient amount of an antistatic additive to reduce or eliminate electrostatic charges on the final molded article. Although the sodium chloride itself assists somewhat in reducing these electrostatic charges, the principal function which it serves is to improve the processing and molding characteristics of the compositions, to improve the molded compositions and to make possible the inclusion of various antistatic additives without their inclusion undesirably affecting the physical characteristics of the molded articles.

The amount of sodium chloride which has been found useful in the practice of the invention can be from about 0.01% to about 10% by weight of the particulate thermoplastic resin molding composition. (All percentages used herein are by weight.) Below this range noticeable improvements on the molding and processing characteristics of the composition are not significant. Above the 10% level the presence of sodium chloride tends to affect undesirably the physical characteristics of the molded thermoplastic resin. It has been found that levels ranging from about .1% to about 0.5% by weight are especially useful concentrations for sodium chloride in the compositions of this invention.

Although the processing advantages achieved by the addition of sodium chloride can be realized in a wide variety of thermoplastic materials, important examples of which are hereinafter described, the invention finds one of its most outstanding applications in the processing and molding of polyethylene resins. Polyethylene is widely utilized for the production of blow-molded bottles and other molded articles. Lower density polyethylene (specific gravity from .910 to .925) is used, for example, for flexible "squeeze" bottles, medium density (specific gravity .926 to .940) and high density polyethylene (ranging from .941 to .965) are used, for example, for the production of more rigid bottles. For a detailed discussion of such molded polyethylene products reference is made to A. Renfrew and Phillip Morgan, Polyethene, 676–7 (Second Edition, Iliff & Sons, Ltd., 1960).

Polyethylene, a product of the ordered polymerization of ethylene gas, is a rigid, somewhat waxy, white translucent plastic material, having excellent resistance to moisture and to most chemicals. It has a molecular weight in excess of 6000 and usually has apparent molecular weights ranging from 10,000 to 1,000,000 or more, customarily measured by such characteristics as heat distortion temperatures. It ranges in specific gravity from about .910 to about .965, and its heat distortion temperature preferably ranges from 105° F. to 180° F. at 66 p.s.i. Being tasteless and odorless it is well suited for food container applications. Articles molded from polyethylene also have good impact resistance and therefore hold up well under rough usage.

Polymethylmethacrylate (specific gravity 1.17–1.20, heat distortion temperature 150°–210° F. (66 p.s.i.)), a resin produced from hydrocyanic acid, acetone, and methyl alcohol, is noted for its very high degree of transparency together with good color characteristics and freedom from yellowing on aging. In molding it requires a higher pressure than plastics such as cellulose acetate or polystyrene. But it gives moldings having high moisture resistance.

Polypropylene, an ordered polymer of propylene gas, is produced in a variety of densities (e.g., specific gravity 0.880 to 0.905), with heat distortion temperatures ranging from 210°–230° F. (66 p.s.i.). The toughness of the molded resin is dependent on its density, toughness increasing with increasing density. The material has a unique property balance of high stiffness, excellent stress-crack resistance, high melting point, and high gloss. Polypropylene also has excellent chemical resistance, and has low permeability to water, most alcohols, weak acids, or bases.

Polystyrene (specific gravity 1.04 to 1.11, heat distortion temperature 150°–235° F., 66 p.s.i.), a water-white thermoplastic produced by the polymerization of vinyl benzene (styrene), is strong, lightweight, and non-toxic. It is suitable for molding a wide variety of products, including toys, housewares, wall tiles, and disposable packages.

Polyvinyl chloride (specific gravity 1.35 to 1.7, heat distortion temperature 130°–165° F., 66 p.s.i.), one of the most important plastics of the vinyl family, is a colorless solid with outstanding resistance to concentrated acids and alkalies, water, and alcohols. In their more rigid forms polyvinyl chlorides are extruded into pipes and building profiles, and they are also used for injection molded applications.

For an excellent discussion of various thermoplastic resins which can be employed, their molding, and applications, reference is made to Modern Plastics Encyclopedia, 1962, pp. 18–26.

Sodium chloride is equally as effective in most combinations or "copolymers" of the above resins. Copolymers are generally formed by heating two liquid monomers in the presence of a catalyst. Examples of such copolymerized materials include compounds such as styrene-acrylonitrile copolymers and styrene-methylmethacrylate copolymers.

Prior to molding, the sodium chloride can be uniformly incorporated in the granular, pelletized or powdered thermoplastic resin molding composition by several methods. These methods include (1) applying (e.g., by spraying) a water solution of sodium chloride (preferably a 10% to 25% concentration) on the resin particles and evaporating the water, (2) "dusting" the particles uniformly with powdered (pulverized or fine crystalline form) sodium chloride preferably less than about 50 microns in diameter, or (3) preparing a smaller concentrated NaCl (.02% to 10%)-containing batch of resin and blending this batch with a larger untreated (NaCl-free) batch of resin to achieve NaCl concentrations in the lower desired ranges of the preferred .01% to about 10% concentration, a technique commonly known in the art as "master batching." A resin to "master batch" ratio ranging from about 1:1 to about 20:1 is desirable. Other techniques can also be used if they accomplish the uniform admixture of NaCl with the particulate resin molding composition. The dusting procedure, however, is most convenient and practical in that an evaporation step or an added mixing and blending step are unnecessary. Preferably the NaCl-containing molding compositions contain no more than about .15% water. Water in higher amounts adversely affects the molding process by causing voids in the plastic resin due to steam formation and by generally impeding extrusion of the resin.

The particulate thermoplastic resin molding composition and the sodium chloride can be intimately blended by means of the extruder used in the processing and molding equipment. While individual extruders vary somewhat, the basic design of a rotating screw within a heated cylinder is typical (see Ernest Bernhardt, Processing of Thermoplastic Materials, 154 (Reinhold Publishing Corp. 1959)). The machine consists essentially of a feed hopper on the input end of a heated cylinder or barrel containing a revolving screw, and having a screen and orifice, often with an attached die, at the output end. The barrel contains separate heating elements in both the rear input end and the front output end. The resin granules, pellets, or powder, together with the sodium chloride which is uniformly admixed with the resin particles, are fed into the cylinder or barrel through the hopper, and enter at the feed end of the revolving screw. There the mixture is heated, mixed, and forced forward by the screw. The fluidized resin-sodium chloride composition is then forced out at the end of the barrel through the screen, out the orifice and molded by means of the die.

Usual barrel operating temperatures commonly observed in the thermoplastic extrusion field are also appropriate for the processing of compositions in which sodium chloride is present. For instance, when processing polyethylene in accordance with the invention, typical temperatures for the barrel are 300° F. for the rear of the barrel, and 480° F. for the front of the barrel, with a die temperature of about 420° F. Suitable ranges for these three stages are respectively 300° to 450° F. for the rear, from 350° F. to 525° F. for the front and from 370° F. to 600° F. for the die (the latter depending upon the article being molded, i.e., 370–400° F. for bottles, 375°–425° F. for pellets, up to 600° F. for films). Temperature control in molding is important, however, and both the temperature and the moisture content of the granules and the barrel itself should be carefully regulated. This requirement is not by any means peculiar to the NaCl-containing molding compositions of this invention or is it unusual practice in the molding art. For some resins it sometimes has been found desirable to cool part of the barrel. This may be done via circulating water, either within the screw or around a part of the barrel. However, such cooling has been found to be generally unnecessary in the processing of sodium chloride-thermoplastic resin molding compositions.

Various sized screens can be used at the output end of the barrel. However, all generally serve the functions of promoting homogeneous mixing, dispersing agglomerated lumps of resin, and affording back pressure.

For a comprehensive discussion of extrusion molding techniques reference is made to Ernest Bernhardt, Processing of Thermoplastic Materials, 153–307 (Reinhold Publishing Corp., New York, 1959).

After the various additives are incorporated in the particulate resin molding composition (NaCl and any antistatic agent used) several improvements are notable in carrying out the processing and molding techniques. First, there is a reduced tendency for the NaCl-containing molding composition to discolor in the extruder. Discoloration is a particularly noticeable defect of thermoplastic molding compositions when they contain an antistatic agent alone, such as a quaternary ammonium chloride as more fully hereinafter described. Discoloration requires periodic cleaning of the extruder and imparts undesirable color to the finished product. It is thought that the greatly increased rate of output and coincident decreased extruder residence time which is made possible by the use of sodium chloride in the molding composition of this invention is the chief contributing factor to the decrease of discoloration. If desired, lower extruder processing temperatures than those previously suggested can be utilized, although there is a coincident increase in processing time with a reduction in temperature. Prolonged heating of thermoplastic resins can discolor them, and this can be a substantial problem when heat degradable additives such as antistatic agents are used.

The marked advantages which result in processing the NaCl-containing molding composition of this invention include, in addition to the substantially increased throughput rate in the extruder, a markedly easier stripping of the molded thermoplastic resin material from the mold.

The molding characteristics are generally improved. The final product as molded has an excellent color and improved surface appearance, probably attributable to the improved mold stripping characteristics. Also the amount of electrostatic charge on the molded object is significantly reduced due to the presence of the NaCl.

Even though there is a significant reduction in the amount of electrostatic charge on the molded articles when only sodium chloride is added to the molding composition, it is usually desirable to incorporate in the composition additional antistatic agents which reduce the level of electrostatic charge to an even greater degree. If antistatic agents are added in sufficient amounts to accomplish the desired elimination of static charges from the molded article and sodium chloride is not included in the composition, an undesirable product results, undesirable in that the plastic is brittle, crumbly, and discolored or speckled in appearance and generally unsatisfactory. However, when sodium chloride is included in the antistatic agent-containing molded composition, the resulting molded plastic is quite satisfactory having excellent physical strength and color, as well as the desired antistatic characteristics.

A number of compounds are suitable for use as antistatic agents in the molding and molded compositions of this invention. As mentioned earlier, the chief use for many of these agents has previously been in external applications. Now, together with sodium chloride, antistatic agents can be included directly in the particulate thermoplastic resin molding composition to accomplish their intended function in the article as molded.

Examples of compounds which are commonly used as antistatic agents are aliphatic quaternary ammonium compounds having various anions (e.g., with $CH_3SO_4^-$, $Cl^-$, and other halogen ions). In quaternary ammonium antistatic agents it is desirable that at least one and preferably two of the groups in the quaternary portion of the molecule be saturated or unsaturated long chain aliphatic groups containing from 10 to 22 carbon atoms. Specific examples are dioleic dimethyl ammonium chloride, didodecyl dimethyl ammonium chloride, and (3-dodecoxy 2-hydroxyl propyl 1-) didodecyl dimethyl ammonium chloride. Higher fatty acid amides, both saturated (e.g., stearamide) and unsaturated (e.g., oleyl amides), are also widely used as antistatic agents. Amines, such as hydroxyalkylated alkylene diamines (described in British specification 839,869) and amine soaps, such as tetraethylene pentamine stearate, are highly satisfactory antistatic agents too. Polymerized ethylene glycol (mol. wt. range of approximately 250-350) is another widely used antistatic substance. A great variety of antistatic agents are available which are generally known to those familiar with the thermoplastic resin art and now they can actually be incorporated in the resins to give the product antistatic properties, with sodium chloride overcoming previous disadvantages.

When antistatic agents are used in the particulate molding compositions of this invention, the amounts which can be used will vary somewhat according to the individual antistatic agent and thermoplastic resin selected, although it has been found that for most antistatic agents a concentration af about .01% to about 5% based on the resin is sufficient to impart desired antistatic characteristics to the molded composition. However, this concentration of antistatic agent must be used in combination with from about 0.01% to about 10% of sodium chloride in order to avoid adversely affecting the physical properties of the finished article. The amount of sodium chloride which is required to enable incorporation of a specific antistatic agent is dependent upon the individual antistatic agent selected and the amount of the agent which is to be incorporated. Generally, higher concentrations of sodium chloride are required for correspondingly higher antistatic agent concentrations. (Appropriate sodium chloride concentrations are illustrated by the herein described examples.) Especially desirable processing, molding, physical and antistatic characteristics are noted when 0.5% sodium chloride and 0.5% antistatic additive are used.

The antistatic additives can be added to the molding composition in a variety of forms. Water or solvent solutions or dry addition are all appropriate means for making this addition, as they are appropriate for the addition of sodium chloride alone. The addition of the antistatic agent as a dry powder is preferable to many other methods for reasons similar to those discussed for the addition of sodium chloride in this form. However, it has been found that the "master batching" technique is not a practical means for adding antistatic agents to the thermoplastic resin molding composition.

In order to illustrate the compositions and process of the present invention, the following examples are presented:

The apparatus used to carry out each of these examples consisted of an extruder (1.5 inch National Rubber Machinery Extruder) as heretofore described, consisting basically of a heated barrel having an input hopper at one end and a rotating screw within the barrel. The material was extruded through a screen (20 mesh) at the output end of the barrel. Examples I to V were run with a two-hole pelletizing die which extruded a double strand of material. This die was used so that output rates could be calculated. In Examples VI and VII the double strands of material which were emitted from the die were water-cooled and pelletized. These two latter examples show the relative differences in the final molded products by comparing products molded from compositions of the invention and from compositions not containing the additives of the invention. (In all examples, thermoplastic resin molding granules used were approximately 1/8 inch in length and 3/32 inch in diameter.)

Example I

An aqueous solution containing 20.0 grams of sodium chloride in 133 ml. of water was mixed with 20,000 grams of polyethylene (Hercules 1600 E. Nat.) molding (cylindrical) granules (specific gravity .94). The water was removed by evaporation, leaving the granular polyethylene containing .1% sodium chloride by weight.

This mixture was fed into the hopper at the rear of the extruding barrel, the rear barrel temperature being 450° F., with a front barrel temperature of 500° F. and a die temperature of 490° F. The extruder output was 11,560 grams per hour. As compared to NaCl-free polyethylene, which processed through the same machine at identical temperatures at a rate of 9,360 grams per hour, this represented an increase in output rate of 25%.

Example II

Sodium chloride was added in .1% concentration by weight to methylmethacrylate (Lucite) molding granules using the water solution-evaporation technique as described in Example I. At a rear barrel temperature of 370° F., front barrel temperature of 375° F., and die temperature of 370° F. the extruder output rate for this mixture was 8,250 grams per hour. As compared to untreated (NaCl-free) methyl methacrylate which processed at a rate of only 7,200 grams per hour at the same temperatures through the extruder, the output of 8,250 grams per hour represented about a 15% increase.

Example III

A concentration of 1% by weight of sodium chloride was added to granular polyethylene (Hercules 1600 E. Nat., specific gravity .94) by the water solution-evaporation technique as used in Example I. At a rear barrel temperature of 400° F., front barrel temperature of 500° F., and die temperature of 490° F., an output rate of 10,128 grams per hour was observed for the mixture. In contrast, the output rate for NaCl-free polyethylene through the same apparatus at the same temperatures was only 8,880 grams. Thus output for the mixture was about 14% greater than that for untreated resin.

*Example IV*

Sodium chloride in fine needle-like crystalline form (dendritic) was added to granular polyethylene (Hercules 1600 E. Nat., specific gravity .95) in a quantity sufficient to form a concentration of 5% NaCl by weight. The mixture was intimately blended in the extruder at a rear barrel temperature of 450° F., 500° F. front barrel, and 490° F. die temperature. The mixture extruded at these temperatures at a rate of 11,120 grams per hour. This rate represented an increase in output of approximately 18% over an observed output at the same processing temperatures of 9,360 grams for NaCl-free polyethylene.

*Example V*

A .1% concentration of sodium chloride was incorporated in a styrene-methylmethacrylate copolymer thermoplastic molding resin (Dow Zerlon) using methods as outlined in Example I. This mixture was blended and extruded at a rear barrel temperature of 375° F., 420° F. front barrel, and 420° F. die temperature. The extruder output rate was 8,030 grams per hour, as compared to a NaCl-free styrene methylmethacrylate sample which extruded at a rate of only 7,560 grams per hour. Thus the NaCl-copolymer mixture was observed to process at a rate which was about 7.5% faster than that for the untreated copolymer.

Individual extruded plastic compositions of Examples I to V are suitable for molding into articles such as blow-molded bottles, toys, housewares, insulators, piping, bottle caps, and numerous other articles.

*Example VI*

15 grams of polymerized ethylene glycol (mol. wt. approximately 300) were dissolved in 100 grams of isopropyl alcohol. This solution was added to 3,000 grams of granular polyethylene (Hercules 1600 E. Nat., specific gravity .94) and the alcohol was removed by air-blast evaporation, leaving a 0.5% concentration of polymerized ethylene glycol uniformly distributed in the polyethylene. Sodium chloride at a .5% concentration was also incorporated in the polyethylene using the aqueous solution-evaporation technique of Example I. The total mixture was blended in the extruder at a 300° F. rear barrel temperature, and extrusion was carried out at this temperature together with a front barrel temperature of 480° M., and a pelletizing die temperature of 490° F. The composition processed well, with no stoppages in the extrusion. Pellets of this blended composition were then pressed into discs 20 to 40 mm. in thickness (the approximate thickness of the wall of a molded bottle) using a die press at a temperature of 420° F. The molded disc was excellent with regard to physical strength and ductility, surface finish, color, and antistatic characteristics. This result was markedly superior to a run which was carried out using identical polyethylene resin containing .5% polymerized ethylene glycol but not sodium chloride. This latter run was characterized by considerable breakage of strands of the polyethylene-polyethylene glycol composition as it was emitted from the extruder screen and orifice, and there was actual stoppage of flow from the extruder. The molded articles contained bubbles which resulted in thin sections, and physical properties were degraded to the point that slight bending of the article resulted in cracking and breaking.

*Example VII*

.5% powdered methyl sulfate quaternary ammonium antistatic agent of the formula

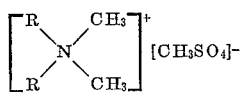

(the R's are alkyl chains of $C_{18}$ length)

and .5% powdered sodium chloride were added to polyethylene (Hercules 1600 E. Nat., specify gravity .94) by tumbling the additives and polyethylene molding granules in a mixing drum for fifteen minutes to distribute the powders uniformly over the surface of the pellets. The mixture was then extruded at a 300° F. rear barrel temperature, 520° F. front barrel temperature, and die temperature of 490° F. The blend processed well, with no stoppages. As in Example VI, a stamping die was used on extruded pellets, the die temperature being 420° F. The molded disc showed no discoloration or other undesirable physical characteristics, and had good antistatic properties. This was in sharp contrast to a similar composition lacking sodium chloride which was extruded and then molded under the same conditions. This latter composition processed at an extremely slow feed rate from the extruder. The resulting molded disc was discolored yellow to brown and contained dark specks, rendering the product generally unsatisfactory.

The NaCl-containing compositions of Examples VI and VII can be blow-molded into containers, such as bottles, instead of discs. Such containers have excellent antistatic, color and physical characteristics.

Other additives, such as dyes and whiteners, can be incorporated in the resin molding compositions of this invention. A wide variety of such colorants are available and are well known to those familiar with the art.

It is to be understood that although the foregoing examples are illustrative of the benefits achieved by utilization of the invention herein described, they are not to be construed as limiting the applications of said invention in any sense.

What is claimed is:

1. A method for preparing a particulate thermoplastic resin molding composition having improved molding and processing characteristics comprising the steps of:
    (1) preparing an aqueous solution of sodium chloride;
    (2) applying said solution to a particulate thermoplastic molding resin selected from the group consisting of polyethylene, polymethylmethacrylate, polypropylene, polystyrene, polyvinyl chloride and combinations and copolymers thereof; and
    (3) evaporating the water until the granules are substantially dry,
the concentration of sodium chloride in the dry granules ranging from about 0.01% to about 10% by weight of the thermoplastic resin.

2. A method for preparing a particulate thermoplastic resin molding composition having improved molding and processing characteristics, comprising the step of intermixing from about .01% to about 10% powdered sodium chloride by weight of the thermoplastic resin and thermoplastic resin molding granules selected from the group consisting of polyethylene, polymethylmethacrylate, polypropylene, polystyrene, polyvinyl chloride, and combinations and copolymers thereof, thereby depositing a fine, uniform layer of sodium chloride having a particle size less than about 50 microns in diameter on the molding granules.

3. A method for preparing a particulate thermoplastic resin molding composition having improved molding and processing characteristics comprising the steps of:
    (1) preparing about one part of a thermoplastic molding composition containing .01% to 10% sodium chloride by weight of the thermoplastic resin, said resin being selected from the group consisting of polyethylene, polymethylmethacrylate, polypropylene, polystyrene, polyvinyl chloride, and combinations and copolymers thereof, and
    (2) combining this composition with from about 1 to about 20 parts of a sodium chloride-free portion of said thermoplastic resin,
the final sodium chloride concentration being from about 0.01% to about 5% by weight of the total thermoplastic resin.

4. A substantially dry particulate molding composition having improved processing and molding characteristics, said molding composition consisting essentially of a uniform admixture of the following:
   (A) a particulate thermoplastic molding resin selected from the group consisting of polyethylene, polymethylmethacrylate, polypropylene, polystyrene, polyvinyl, chloride, and combinations and copolymers thereof,
   (B) sodium chloride in the amount of from about 0.01% to about 10% by weight of thermoplastic resin,
   (C) an antistatic agent of from about 0.01% to about 5% by weight of thermoplastic resin.

5. The composition of claim 4 in which the thermoplastic resin is polyethylene and the antistatic agent is an aliphatic quaternary ammonium compound.

6. The composition of claim 4 in which the thermoplastic resin is polyethylene and the antistatic agent is polymerized ethylene glycol.

7. A heat molded article consisting essentially of
   (A) a heat-molded particulate thermoplastic molding resin selected from the group consisting of polyethylene, polymethylmethacrylate, polypropylene, polystyrene, polyvinyl chloride, and combinations and copolymers thereof,
   (B) sodium chloride in the amount of from about 0.01% to about 10% by weight of thermoplastic resin,
   (C) an antistatic agent of from about 0.01% to about 5% by weight of thermoplastic resin.

8. The molded article of claim 7 in which the thermoplastic resin is polyethylene and the antistatic agent is an aliphatic quaternary ammonium compound.

9. The molded article of claim 7 in which the thermoplastic resin is polyethylene and the antistatic agent is polymerized ethylene glycol.

References Cited by the Examiner
UNITED STATES PATENTS

| | | | |
|---|---|---|---|
| 2,052,590 | 9/1936 | Whitehead | 264—211 |
| 2,648,649 | 8/1953 | Stanton et al. | 260—29.1 |
| 2,649,382 | 8/1953 | Vesce | 260—41 |
| 2,705,227 | 3/1955 | Stamatoff | 260—45.7 |
| 3,117,113 | 1/1964 | Tudor. | |

MORRIS LIEBMAN, *Primary Examiner.*